W. H. POTTER.
Apparatus for Destroying Insects.
No. 219,014.  Patented Aug. 26, 1879.
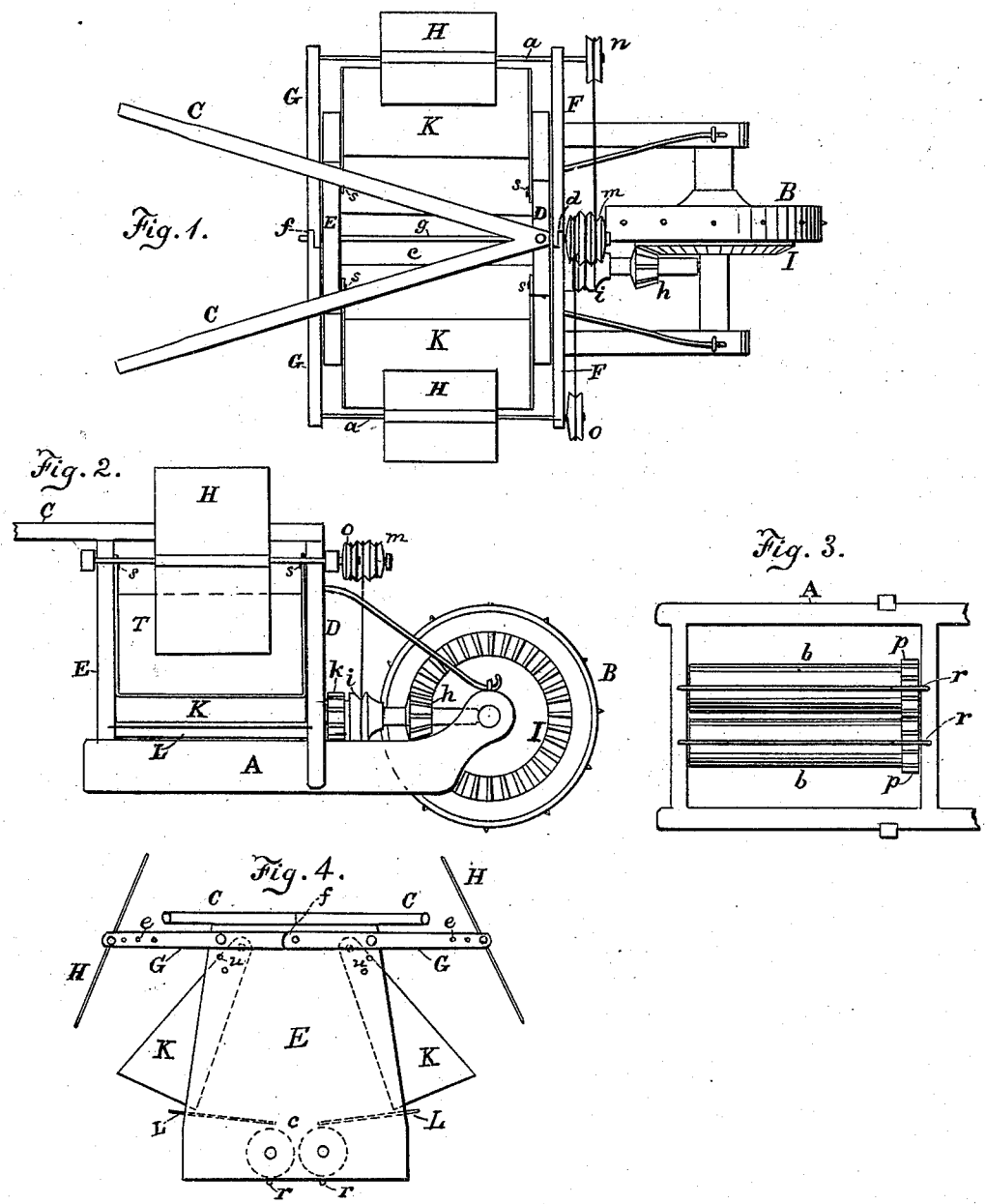

UNITED STATES PATENT OFFICE.

WILLIAM H. POTTER, OF LEYDEN, NEW YORK.

IMPROVEMENT IN APPARATUS FOR DESTROYING INSECTS.

Specification forming part of Letters Patent No. 219,014, dated August 26, 1879; application filed January 6, 1879.

*To all whom it may concern:*

Be it known that I, WILLIAM H. POTTER, of Leyden, in the county of Lewis and State of New York, have invented certain new and useful Improvements in Apparatus for Destroying the Insect known as the "Potato-Bug;" and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to the class of machines for destroying insects, and the device herein described is particularly adapted for the destruction of the potato-bug.

The invention consists in providing the hopper, into which the insects are beaten from the vines, with sides, which are pivoted to the machine, so that they are adjustable toward and from the beaters, as required by circumstances, the beaters being also adjustable toward and from the hopper, as hereinafter more fully set forth.

In the drawings referred to as forming a part of this specification, Figure 1 is a plan view of a machine having my improvements. Fig. 2 is a side view of the same. Fig. 3 is a partial plan view of the bottom, and Fig. 4 is a rear view of the machine.

A designates the frame of the machine, which is provided with a wheel, B, and the handle C, by means of which it may be moved along by hand, somewhat in the way that a wheelbarrow is used, the frame being constructed so that its lower part, in operation, is near the surface of the ground.

D and E are the front and rear upright portions of the case or body, between which is the hopper L, or receptacle for the insects, an opening, c, being made in the bottom of this receptacle along the center. Just below the opening c two rollers, b, are placed under the hopper and have bearings in the frame, so that the insects when beaten into the hopper pass down through the opening c and are crushed between the rollers b.

F indicates the front arms, and G the rear arms, in which the shafts a, holding the beaters H, have their bearings, one of the said beaters being placed on each side of the machine and rotated so as to beat the insects from the potato-vines on both sides of the machine into the hopper.

The beaters are adjustable horizontally and vertically in their positions, the holes e being provided for a lateral adjustment of the shafts a, and the arms F and G having joints d and f where they are secured to the body of the machine by the rod g, so that the said arms may be turned downward and set at any desired angle by means of holes u and bolts.

K designates the sides of the hopper, which are adjustably secured at s to the body of the frame, so that they may be raised or depressed according to the positions of the beaters H.

By this construction the beaters H and the movable sides K may be adjusted in position nearer to or farther from each other, as circumstances may require.

As the machine is moved along between the rows of vines motion is imparted to the beaters in the following manner: The gear I, formed on or secured to the side of wheel B, being a driving-wheel, engages with a pinion, h, on a short shaft holding a pulley, i, and another pinion, k. Above the pulley i and on the rod g, as shown, is a pulley, m, having three grooves to receive endless bands or cords, one of them passing over pulley i, and the others severally passing over pulleys n and o on the shafts a of the beaters H.

The crushing-rollers b are provided with gearing p, which connects with the pinion k, so that all the parts are put in motion simultaneously.

The rollers are further provided with rods r, which serve as guards and clear the rollers of whatever adheres to them.

The slab or board T, set in the center of the machine, serves, as the insects are beaten against it, to direct them downward.

I claim—

In apparatus for destroying insects, the arms F and G, holding the shafts $a$, with beaters H, said arms being made adjustable, as shown, in combination with the adjustable sides K and hopper L, as and for the purposes described.

In testimony that I claim the foregoing as my own I affix hereto my signature in presence of two witnesses.

WM. H. POTTER.

Witnesses:
C. D. DEWEY,
A. MOELING.